United States Patent
Piao et al.

(10) Patent No.: US 10,190,567 B2
(45) Date of Patent: Jan. 29, 2019

(54) HEAVY HAMMER TYPE WAVE POWER GENERATION METHOD AND DEVICE

(71) Applicant: Chenghao Piao, Jilin (CN)

(72) Inventors: Chenghao Piao, Changchun (CN); Takeyoshi Kimra, Miyagi (JP); Yotaku Ra, Tokyo (JP); Tarou Kimura, Saitama (JP)

(73) Assignee: Changchun University of Science and Technology, Changchun (CN)

( * ) Notice: Subject to any disclaimer, the term of this patent is extended or adjusted under 35 U.S.C. 154(b) by 97 days.

(21) Appl. No.: 15/514,517

(22) PCT Filed: Oct. 28, 2014

(86) PCT No.: PCT/CN2014/000954
§ 371 (c)(1),
(2) Date: Mar. 25, 2017

(87) PCT Pub. No.: WO2016/065496
PCT Pub. Date: May 6, 2016

(65) Prior Publication Data
US 2017/0234290 A1 Aug. 17, 2017

(51) Int. Cl.
*F03B 13/16* (2006.01)
*F16D 41/12* (2006.01)
(Continued)

(52) U.S. Cl.
CPC ............. *F03B 13/16* (2013.01); *F16D 41/12* (2013.01); *F16H 31/001* (2013.01); *F16H 37/02* (2013.01);
(Continued)

(58) Field of Classification Search
CPC ............... F03B 13/16; F05B 2220/706; F05B 2240/93; F05B 2260/40311;
(Continued)

(56) References Cited

U.S. PATENT DOCUMENTS

| 4,352,023 A * | 9/1982 | Sachs ...................... F03B 13/20 |
| | | 290/42 |
| 8,669,668 B2 * | 3/2014 | Levy ..................... F03B 13/186 |
| | | 290/42 |

(Continued)

FOREIGN PATENT DOCUMENTS

| CN | 2466421 Y | 12/2001 |
| CN | 201730729 U | 2/2011 |

(Continued)

OTHER PUBLICATIONS

Search report of PCT/CN2015/095157.

*Primary Examiner* — Mark Laurenzi
*Assistant Examiner* — Shafiq Mian
(74) *Attorney, Agent, or Firm* — Wayne & Ken, LLC; Tony Hom (57) ABSTRACT

The invention discloses a heavy hammer type wave power generation method and device. According to the invention, under the action of wave power and gravity, a floating box enables driving sprockets and guiding sprockets to turn leftwards or rightwards along a chain, the driving sprockets turn leftwards or rightwards by means of a speed-increasing gear in a speed-increasing box and a transmission mechanism for converting bidirectional swinging to unidirectional rotation, a generator shaft always rotates in one direction to generate power. According to the invention, a wave energy collecting method is simple and easy, a large amount of wave energy can be collected, energy converting efficiency is high, the structure is simple, manufacturing costs are low, maintenance is avoided for a long time, service life is long, safety is good, a wave power generation station can be established by networking.

5 Claims, 5 Drawing Sheets

(51) Int. Cl.
*F16H 31/00* (2006.01)
*F16H 37/02* (2006.01)

(52) U.S. Cl.
CPC ..... *F05B 2220/706* (2013.01); *F05B 2240/93* (2013.01); *F05B 2260/40311* (2013.01); *F05B 2260/505* (2013.01); *Y02B 10/30* (2013.01); *Y02E 10/38* (2013.01); *Y02E 10/725* (2013.01)

(58) Field of Classification Search
CPC .... F05B 2260/505; F16D 41/12; F16H 37/02; F16H 31/001
USPC .......................... 290/43, 54, 42, 53
See application file for complete search history.

(56) References Cited

U.S. PATENT DOCUMENTS

| | | | |
|---|---|---|---|
| 9,790,913 B2* | 10/2017 | Stewart | F03B 13/20 |
| 2006/0028026 A1* | 2/2006 | Yim | F03B 13/1815 |
| | | | 290/53 |
| 2009/0015013 A1* | 1/2009 | Jaer | F03B 13/16 |
| | | | 290/53 |
| 2009/0230684 A1* | 9/2009 | Gasendo | F03B 13/186 |
| | | | 290/53 |
| 2009/0295167 A1* | 12/2009 | Clidaras | F03B 13/20 |
| | | | 290/55 |
| 2010/0025999 A1* | 2/2010 | Kim | F03B 13/14 |
| | | | 290/53 |
| 2011/0012368 A1* | 1/2011 | Hahmann | F03B 13/187 |
| | | | 290/1 C |
| 2011/0089696 A1* | 4/2011 | Davis | F03B 13/1865 |
| | | | 290/53 |
| 2012/0001432 A1* | 1/2012 | Clement | F03B 13/20 |
| | | | 290/53 |
| 2015/0266549 A1* | 9/2015 | Qu | F03D 3/02 |
| | | | 248/550 |
| 2016/0138559 A1* | 5/2016 | Bauer | F03B 17/063 |
| | | | 290/43 |

FOREIGN PATENT DOCUMENTS

| | | |
|---|---|---|
| CN | 102787965 A | 11/2012 |
| CN | 103807086 A | 5/2014 |
| FR | 2535403 A2 | 5/1984 |
| JP | 1981-27075 A | 3/1981 |
| JP | 1998-18956 A | 1/1998 |

* cited by examiner

HEAVY HAMMER TYPE WAVE POWER GENERATION METHOD AND DEVICE

TECHNICAL FIELD

The invention relates to a heavy hammer type wave power generation method and device.

BACKGROUND OF THE INVENTION

Never-ending waves on the vast ocean contain a huge amount of energy. Under the effect of wave force, if a cubic meter of rising and falling seawater on the surface of the sea can produce 5 kw power on the condition that the average wave height is 1.5 meters and cycle is 6 seconds and the 5 kw wave power can be all transformed into electricity, 120 kwh per day can be obtained from wave power of one cubic meter of seawater. Provided that a family needs 6 kwh per day, it can meet the demand of 20 families. Therefore, there is a huge amount of cheap renewable resource in waves. And the value of the renewable resource continuously inspirits people to explore all kinds of wave power generation methods and devices.

The world has published thousands of patents and documents about wave power generation methods and devices up to now, and several dozens of wave power generation devices are implemented and operated, and the United Nations listed ocean wave power generation in the first place in the development of the ocean renewable energy sources. However, satisfying wave power generation methods and devices which can be widely used in commercial operation in economic benefits have not yet appeared. Therefore, wave power generation technology with energy density far greater than wind energy is far behind wind power generation technology currently.

SUMMARY OF THE INVENTION

The power generation scheme of the invention is realized by providing a heavy hammer type wave power generation method and device, characterized in that the heavy hammer type wave power generation method comprises following steps: arranging a rotating shaft in the middle of a floating box connected to an anchor seat by a cable on sea surface, connecting a vertical shifting rod to the rotating shaft, and the shifting rod can turn along the rotating shaft, fixing a heavy hammer with required weight to a lower end of the shifting rod, and fixedly connecting a chain ring meshed with a plurality of driving sprockets and guiding sprockets to an upper end of the shifting rod, fixing a shaft of the driving sprockets in a speed-increasing box, and meshing gears fixed to the shaft of the driving sprockets by a speed-increasing gear and a gear fixed to the generator shaft.

When the sea surface has no wave, the floating box not swings, under the action of gravity, the heavy hammer enables the shifting rod to be always in vertical state; when the sea surface has wave, if the chain ring is not fixedly connected to the upper end of the shifting rod and only meshed with driving sprockets and guiding sprockets, the chain ring and driving sprockets and guiding sprockets fixed to the framework of the floating box swing up and down towards the left or right along the floating box, and the shifting rod is in vertical state under gravity of the heavy hammer; however, the chain ring is fixedly connected to the upper end of the shifting rod, the chain ring is restrained by the shifting rod, under the reversed torque of the gravity of the heavy hammer, the chain ring cannot swing along the floating box, the driving sprockets and the guiding sprockets turn leftwards or rightwards along the chain ring.

The driving sprockets turn leftwards or rightwards by means of a speed-increasing gear in a speed increaser fixed to the framework of the floating box and a transmission mechanism for converting bidirectional swinging to unidirectional rotation, so that a spindle of a generator always rotates in one direction to generate power, and the rated torque produced on generator shaft is acted on the chain ring by sprockets, so that the gravity of the heavy hammer at the lower end of the shifting rod deviates L distance with reversed direction of rate torque to balance the rate torque of the generator and enable the generator to continuously rotate to one direction as rated rotating speed to generate power. The gravity torque produced by center of gravity shift of the heavy hammer is actually torque balance produced with wave force, the shift of L distance is produced when reversing left and right swinging of the floating box, and the size of L distance depends on rated driving torque of the generator and heavy hammer quality, the shortening of L distance is good for the increase of turning distance of driving sprockets in one swinging route of the floating box.

The torque produced by wave force is dynamic torque to drive the generator to generate power, collected size of wave force torque depends on the size of base area of the floating box and wave height, the wave force torque is acted on the generator shaft to overcome rated driving torque of the generator, however, gravity torque of the heavy hammer and wave force torque should be produced simultaneously to turn the generator shaft. Wave force torque and gravity torque of the heavy hammer enable the generator to turn leftwards or rightwards repeatedly, however, the generator cannot generate power normally. So the speed increaser of the transmission mechanism for converting bidirectional turning to unidirectional rotation is an indispensable requirement to enable the generator to generate power normally.

According to the size of the generated power, a plurality of driving sprockets are arranged in the chain ring within the floating box, one speed-increasing box and generator are connected to each driving sprocket shaft, and the quantity of driving sprockets is determined by required generated power, heavy hammer quality, weight of the floating box and wave energy size that the floating box can be collected.

The significant effects of the invention are as follows: firstly, a wave energy collecting method of the invention is simple and easy and a large amount of wave energy can be collected and energy converting efficiency is high; secondly, the structure is simple and manufacturing costs are low; thirdly, all members related to power generation are all arranged in sealed floating box and not in contact with seawater, so the members have no possibility for seawater corrosion and damage. Proper lubrication measures are adopted for moving members, so that maintenance is simple, maintenance is avoided for a long time, service life is long, durability is good and can be permanent device; fourthly, power generation device floats on the sea surface, only the cable strength is greater than buoyancy of entire floating box, the cable will not be broken by high waves, and the device will not be damaged, so the storm-proof ability is strong and safety is good; fifthly, a wave power generation station can be established by networking, and more electric energies can be obtained.

Based on above-mentioned significant effects, the method and device of the invention has significant economic benefits and comprehensive commercial value.

Compared with current wave power generation method and device, wave energy collecting method of the invention is simpler and easier, and a large amount of wave energy can be collected, besides, the invention has features of high energy converting efficiency, good durability, long service life is long, strong storm-proof ability, good safety, simple structure, easy manufacture, low manufacturing cost, so the invention has significant economic benefits and comprehensive commercial value.

BRIEF DESCRIPTION OF THE DRAWINGS

The invention is described in detail in combination with drawings and embodiments.

Figure 1:
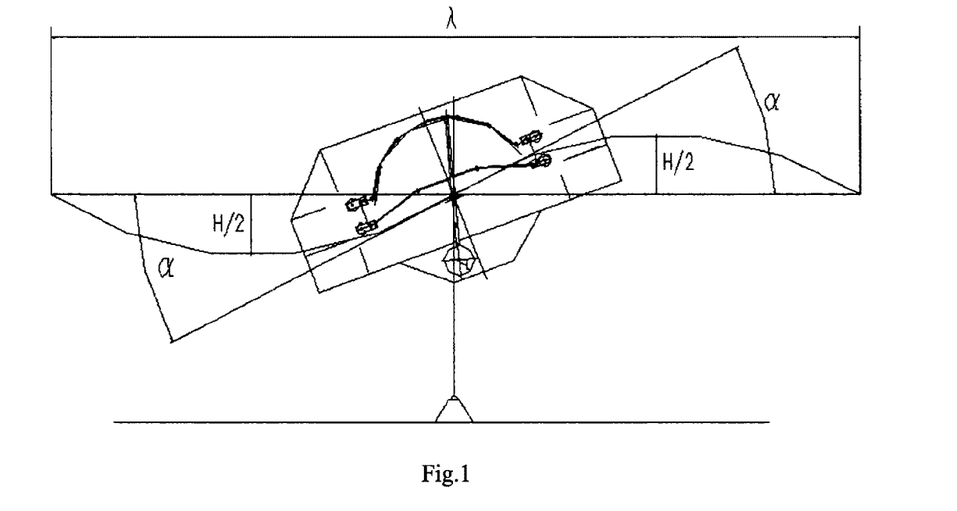
FIG. 1 and FIG. 2 are diagrams when the device of the invention swings in a wave to generate power.
Figure 2:
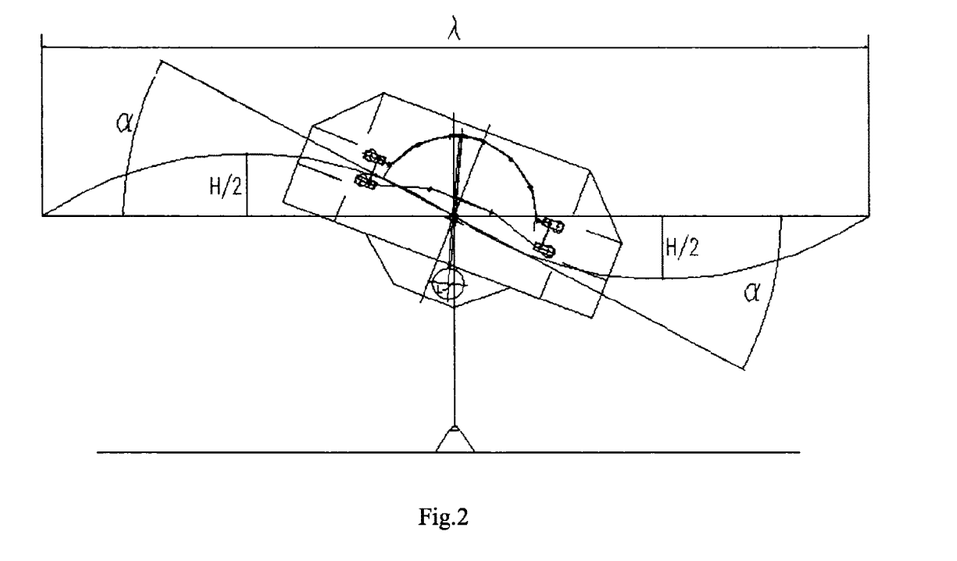

FIG. 1 is a diagram when a floating box swings counter clockwise under wave action; and FIG. 2 is a diagram when a floating box swings clockwise under wave action.

Figure 3:
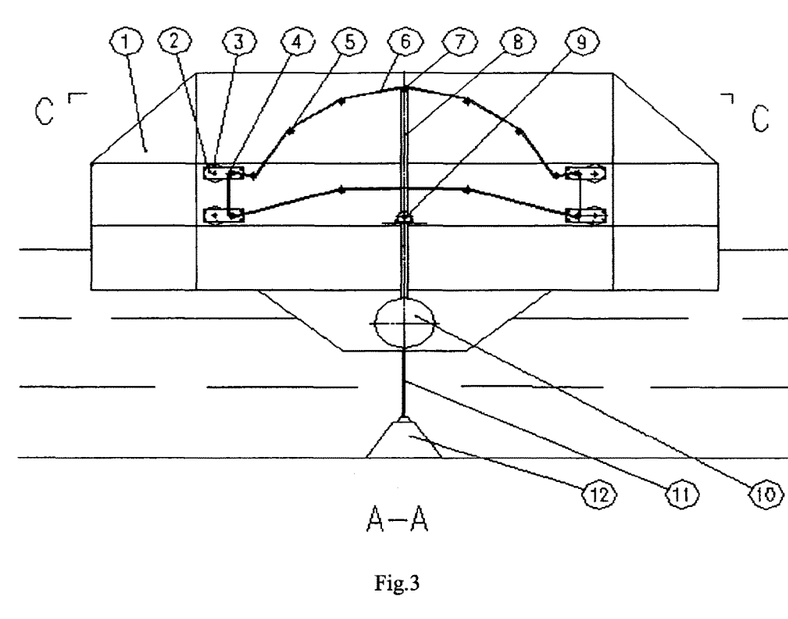
FIG. 3 is a front section view of A-A direction of the device of the invention.
Figure 4:
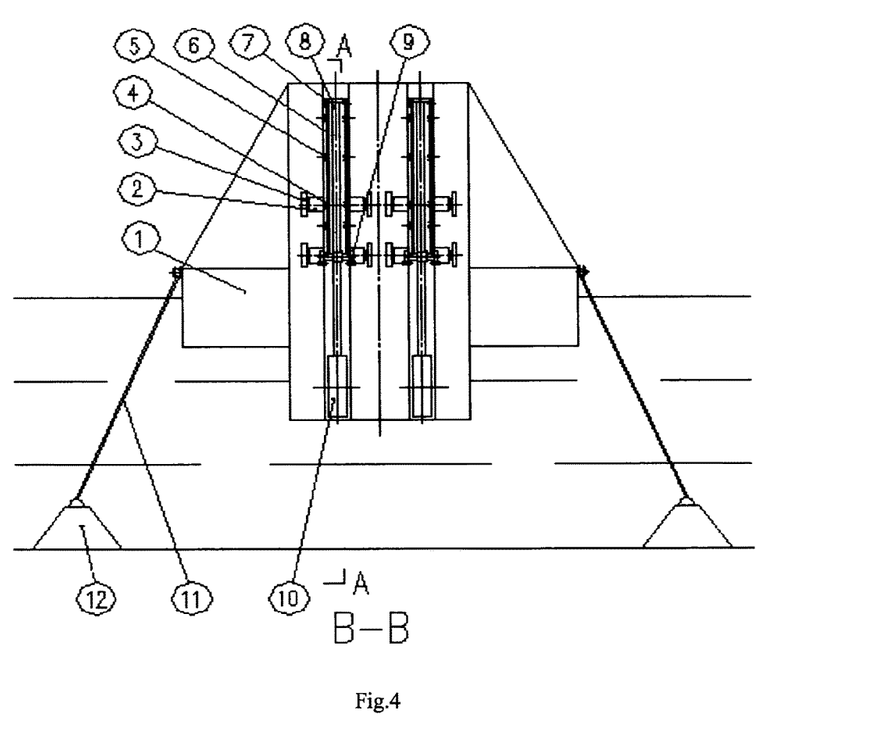
FIG. 4 is a side section view of B-B direction of the device of the invention.
Figure 5:
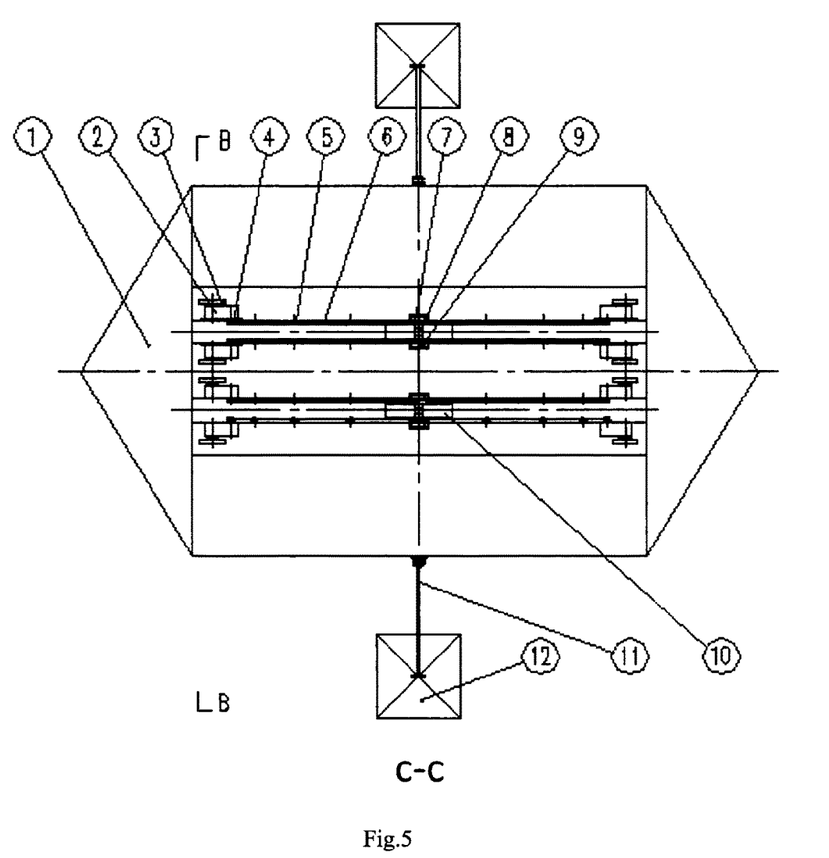
FIG. 5 is a top section view of C-C direction of the device of the invention.

FIG. 3, FIG. 4 and FIG. 5 are detailed structure diagrams of the heavy hammer type wave power generation device, comprising a floating box (1), a speed increaser for converting bidirectional swinging to unidirectional rotation (2), a generator (3), driving sprockets (4), guiding sprockets (5), a chain ring (6), a chain fixing seat (7), a shifting rod (8), a rotating shaft (9), a heavy hammer (10), a cable (11) and an anchor seat (12).

Figure 6:
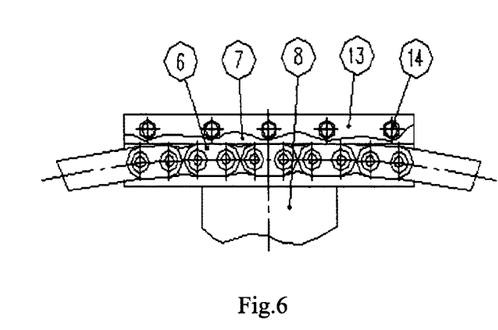
FIG. 6 and FIG. 7 are structure diagrams when a shifting rod is fixedly connected to a chain ring.
Figure 7:
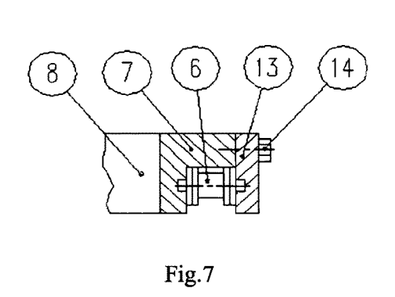

FIG. 6 and FIG. 7 are structures when the chain ring (6) is fixedly connected to the shifting rod (8), comprising the chain ring (6), the chain fixing seat (7), a chain pressing plate (13) and a bolt (14).

Figure 8:
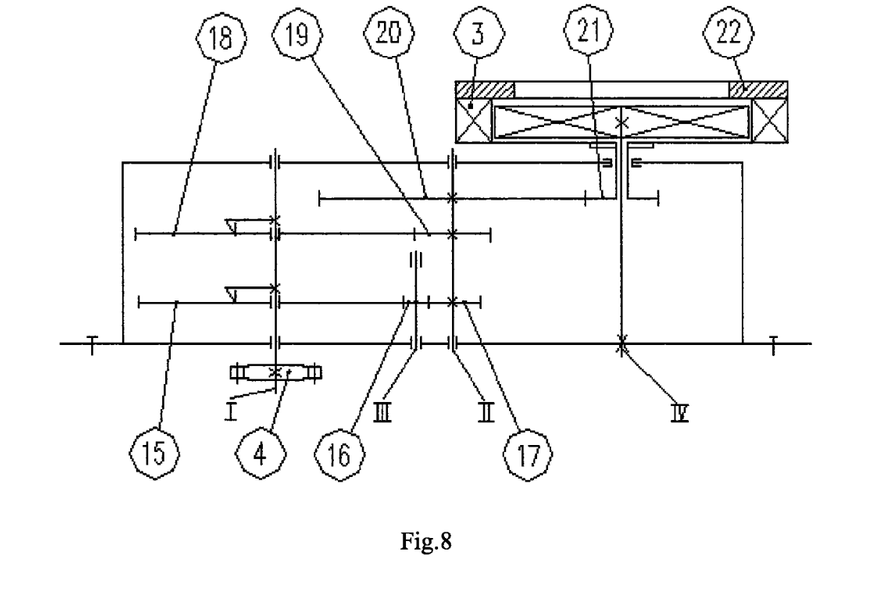
FIG. 8 is a structure diagram of a speed increaser for converting bidirectional swinging to unidirectional rotation.

FIG. 8 is a diagram of the speed increaser for converting bidirectional swinging to unidirectional rotation, comprising driving sprockets (4), a first ratchet gear (15), a medium gear (16), a first speed-increasing gear (17), a second ratchet gear (18), a second speed-increasing gear (19), a third speed-increasing gear (20), a generator shaft gear (21), an energy storage flywheel (22), a driving sprocket shaft (I), a speed-increasing shaft (II), a medium shaft (III) and a generator shaft (IV).

DETAILED DESCRIPTION OF THE INVENTION

The preferred embodiments of the invention are shown in FIG. 1, FIG. 2, FIG. 3, FIG. 4 and FIG. 5, the main design basis of the device is that the swinging speed of the floating box is calculated by average wave velocity and base area of the floating box, heavy hammer quality and structure size based on wave parameter and required generated power. All parameters and structures related to the design can be determined and designed based on current mathematical knowledge, physic knowledge and design knowledge.

FIG. 1 and FIG. 2 show that a floating box (1) on the sea surface is connected to an anchor seat (12) by a cable (11), under the action of up-and-down wave, the floating box (1) swings up and down towards the left or the right within the scope of double wave angle a of sea wave, and all wave energies on the bottom of the floating box (1) convert to swinging kinetic energy of the floating box (1), the size of the swinging kinetic energy of the floating box depends on base area of the floating box and the wave height, which is the simplest, most direct and most efficient method to collect wave energy.

In FIG. 3, FIG. 4 and FIG. 5, a rotating shaft (9) is arranged in the middle of the floating box (1), a shifting rod (8) is connected to the rotating shaft (9), the shifting rod (8) can rotate around the rotating shaft (9), a heavy hammer (10) is fixed to the lower end of the shifting rod (8), a chain ring (6) meshed with a plurality of driving sprockets (4) and guiding sprockets (5) is fixedly connected to an upper end of the shifting rod by a chain fixing seat (7); under the action of wave power, when the floating box (1) swings leftwards or rightwards, the chain ring (6) is restrained by the heavy hammer (10) at a lower end of the shifting rod (8) and cannot turn with the leftward or rightward swinging of the floating box (1), the driving sprockets (4) and the guiding sprockets (5) turn leftwards or rightwards along the chain ring (6), and the driving sprockets (4) turn leftwards or rightwards by means of a speed increaser for converting bidirectional swinging to unidirectional rotation (2) fixed to a framework of the floating box (1), so that a spindle of a generator (3) always rotates in one direction to generate power; an external-rotor wind driven generator (3) is adopted to increase power generating efficiency, when an energy storage flywheel (22) fixedly connected to the external-rotor enables the floating box (1) to turn leftwards or rightwards, the driving energy driving the spindle of the generator (3) is still constant, so that a voltage waveform of the generator (3) is smooth.

As shown in FIG. 8, the function for converting bidirectional swinging to unidirectional rotation of the driving sprockets (4) is realized by adopting the structure of embodiment of FIG. 1 and FIG. 2 in Chinese Patent ZL01202356.6A named Transmission Mechanism for Converting Swinging of Driving Shaft to Unidirectional Rotation of Driven Shaft invented by Chenghao Piao. In this invention, embodiment of FIG. 2 is adopted, the driving sprocket shaft (I) in FIG. 8 corresponds to the driving shaft (I) of FIG. 2 of above-mentioned patent, and the speed-increasing shaft (II) corresponds to the driven shaft (II), a first ratchet gear (15) with a pawl structure and a second ratchet gear (18) with a pawl structure are fixed to the driving sprocket shaft (I); an outer ring of the first ratchet gear (15) idles counter clockwise, and an outer ring of the second ratchet gear (18) idles clockwise, a first speed-increasing gear (17) fixed to the speed-increasing shaft (II) is meshed with the first ratchet gear (15) on the driving sprocket shaft (I) by a medium gear (16) on a medium gear shaft (III), a second speed-increasing gear (19) fixed on the speed-increasing shaft (II) is directly meshed with the second ratchet gear (18) on the driving sprocket shaft (I), when the driving sprocket shaft (I) of the driving sprockets (4) rotates counter clockwise, the outer ring of the first ratchet gear (15) idles and cannot transfer a torque to the medium gear (16) and the first speed-increasing gear (17), and the outer ring of the second ratchet gear (18) turns counter clockwise and cannot transfer a torque to the second speed-increasing gear (19), so that the speed-increasing shaft (II) turns clockwise; when the driving sprocket shaft (I) rotates clockwise, the outer ring of the second ratchet gear (18) idles and cannot transfer the torque to the second speed-increasing gear (19), and the outer ring of the first ratchet gear (15) transfers the torque to the medium gear (16) and the first speed-increasing gear (17), so that the speed-increasing shaft (II) turns clockwise; so no matter the driving sprocket shaft (I) turns counter clockwise or clockwise, the speed-increasing shaft (II) always turns clockwise, so that a third speed-increasing gear (20) on the speed-increasing shaft (II) enables a generator shaft gear (21) on the speed-increasing shaft (II) to always rotates in one direction for converting bidirectional swinging to unidirectional rotation for normal power of the generator (3); and a rated speed of the generator (3) is determined by a gear number of each gear.

FIG. 6 and FIG. 7 show that the chain ring (6) is fixedly connected to the upper end of the shifting rod (8) by a chain fixing seat (7), a chain pressing plate (13) and a bolt (14).

The breaking strength of the cable (11) shown in FIG. 3, FIG. 4 and FIG. 5 is greater than integral buoyancy force of the floating box or a disconnecting structure when overloading is designed, the safety of the device in any high waves can be guaranteed.

Figure 9:
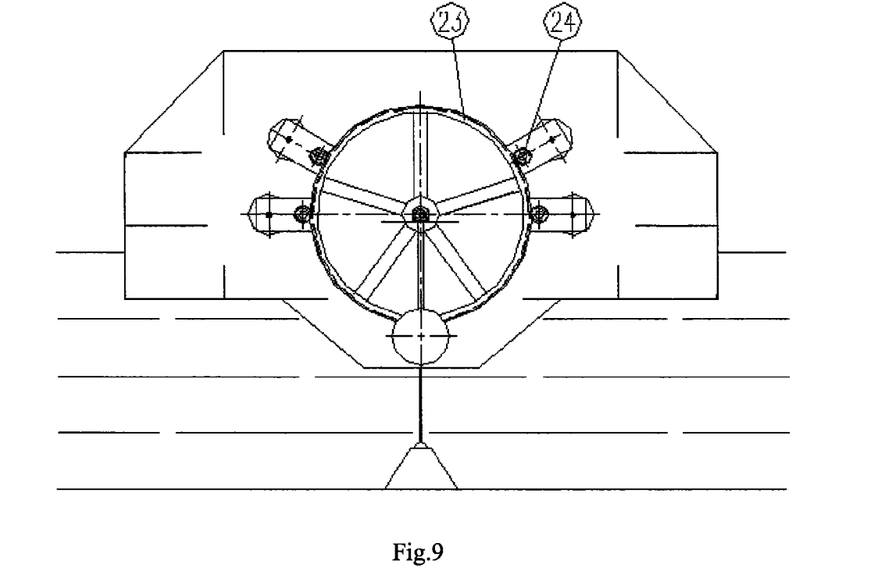
FIG. 9 is a diagram of a sprocket chain driving mechanism of the device of the invention, and the sprocket chain driving mechanism can be replaced by a large gear and a small gear mechanism.

The device of the invention can adopt the structure shown in FIG. 9, a plurality of driving sprockets (4), a plurality of guiding sprockets (5) and the chain ring (6) in the structure of the embodiment shown in FIG. 3, FIG. 4 and FIG. 5 are cancelled and replaced by one large gear (23) and a plurality of small gears (24), so that chain transmission becomes gear transmission structure, which enables assembly and adjustment to be easy and transmission efficiency to be improved. As for current technologies, it is feasible to manufacture gear with a diameter of several meters, however, the manufacturing costs of the device are improved.

What is claimed is:

1. A heavy hammer type wave power generation method, characterized by comprising:
    connecting a floating box (1) to an anchor seat (12) by a cable (11);
    arranging a rotating shaft (9) in the middle of the floating box (1);
    connecting a shifting rod (8) to the rotating shaft (9), the shifting rod (8) rotates around the rotating shaft (9);
    fixing a heavy hammer (10) to a lower end of the shifting rod (8);
    fixedly connecting a chain ring (6) meshed with a plurality of driving sprockets (4) and guiding sprockets (5) to an upper end of the shifting rod by a chain fixing seat (7);
    under the action of wave power, when the floating box (1) swings leftwards or rightwards, the chain ring (6) is restrained by the heavy hammer (10) at the lower end of the shifting rod (8) without turning with the leftward or rightward swinging of the floating box (1);
    the driving sprockets (4) and the guiding sprockets (5) turn leftwards or rightwards along the chain ring (6), and the driving sprockets (4) turn leftwards or rightwards by means of a speed increaser for converting bidirectional swinging to unidirectional rotation (2) fixed to a framework of the floating box (1), so that a spindle of a generator (3) rotates in one direction to generate power;
    an external-rotor wind driven generator (3) is adopted to increase power generating efficiency, when an energy storage flywheel (22) fixedly connected to the external-rotor enables the floating box (1) to turn leftwards or rightwards, the driving energy driving the spindle of the generator (3) is still constant, so that a voltage waveform of the generator (3) is smooth;
    fixing a first ratchet gear (15) with a pawl structure and a second ratchet gear (18) with a pawl structure to a driving sprocket shaft (I);
    the bidirectional swinging of the driving sprocket shaft (I) coverts to unidirectional rotation of a speed-increasing shaft (II);
    an outer ring of the first ratchet gear (15) idles counter clockwise, and an outer ring of the second ratchet gear (18) idles clockwise;
    meshing a first speed-increasing gear (17) fixed to the speed-increasing shaft (II) with the first ratchet gear (15) on the driving sprocket shaft (I) by a medium gear (16) on a medium gear shaft (III);
    directly meshing a second speed-increasing gear (19) fixed on the speed-increasing shaft (II) with the second ratchet gear (18) on the driving sprocket shaft (I);
    when the driving sprocket shaft (I) of the driving sprockets (4) rotates counter clockwise, the outer ring of the first ratchet gear (15) idles without transferring a torque to the medium gear (16) and the first speed-increasing gear (17); the outer ring of the second ratchet gear (18) turns counter clockwise without transferring a torque to the second speed-increasing gear (19), so that the speed-increasing shaft (II) turns clockwise;
    when the driving sprocket shaft (I) rotates clockwise, the outer ring of the second ratchet gear (18) idles without transferring the torque to the second speed-increasing gear (19); the outer ring of the first ratchet gear (15) transfers the torque to the medium gear (16) and the first speed-increasing gear (17), so that the speed-increasing shaft (II) turns clockwise;
    the speed-increasing shaft (II) always turns clockwise, so that a third speed-increasing gear (20) on the speed-increasing shaft (II) enables a generator shaft gear (21) on the speed-increasing shaft (II) to always rotate in one direction for converting bidirectional swinging to unidirectional rotation for normal power of the generator (3); and
    a rated speed of the generator (3) is determined by a gear number of each gear.

2. A device of the heavy hammer type wave power generation method according to claim 1, characterized in that the device comprises:
    a floating box (1), a speed increaser (2) for converting bidirectional swinging to unidirectional rotation, a generator (3), a plurality of driving sprockets (4), a plurality of guiding sprockets (5), a chain ring (6), a chain fixing seat (7), a shifting rod (8), a rotating shaft (9), a heavy hammer (10), a cable (11) and an anchor seat (12); and wherein the floating box (1) is connected to the anchor seat(12) by the cable (11).

3. The device of the heavy hammer type wave power generation method according to claim 2, characterized in that the device further comprises:
    a first ratchet gear (15), a second ratchet gear (18), a medium gear (16), a first speed-increasing gear (17), a second speed-increasing gear (19), a third speed-increasing gear (20) and a generator shaft gear (21); and wherein the speed increaser converting bidirectional swinging to unidirectional rotation (2) is fixedly connected to the framework of the floating box (1).

4. The device of the heavy hammer type wave power generation method according to claim 2, characterized in that the device further comprises a sprocket chain driving mechanism, and the sprocket chain driving mechanism is replaced by a large gear (23) and a small gear (24) structure for easy assembly and adjustment and improved transmission efficiency.

5. The device of the heavy hammer type wave power generation method according to claim 2, characterized in that based on requirements of generated power, multiple generating capacities are obtained with a plurality of same sets of heavy hammer type device and little increased volume.

\* \* \* \* \*